United States Patent
Doege

(10) Patent No.: US 9,960,464 B2
(45) Date of Patent: May 1, 2018

(54) METHOD AND DEVICE FOR HOMOGENIZING THE TEMPERATURE DISTRIBUTION OF BODIES WHICH HAVE FLUIDIC TEMPERATURE CONTROL

(75) Inventor: Volker Doege, Dischingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 378 days.

(21) Appl. No.: 14/112,642

(22) PCT Filed: Feb. 20, 2012

(86) PCT No.: PCT/EP2012/052839
§ 371 (c)(1),
(2), (4) Date: Dec. 31, 2013

(87) PCT Pub. No.: WO2012/143152
PCT Pub. Date: Oct. 26, 2012

(65) Prior Publication Data
US 2014/0102688 A1    Apr. 17, 2014

(30) Foreign Application Priority Data

Apr. 18, 2011   (DE) .......................... 10 2011 007 606

(51) Int. Cl.
*H01M 2/00*    (2006.01)
*H01M 10/63*    (2014.01)
(Continued)

(52) U.S. Cl.
CPC ...... *H01M 10/502* (2013.01); *B60H 1/00278* (2013.01); *G05D 23/1919* (2013.01);
(Continued)

(58) Field of Classification Search
CPC .......... F28F 13/06; F28F 27/02; H01M 10/61; H01M 10/613; H01M 10/615;
(Continued)

(56) References Cited

U.S. PATENT DOCUMENTS 4,582,765 A * 4/1986 Kothmann ........ H01M 8/04014
165/97
5,215,834 A * 6/1993 Reher ................. B60L 11/1861
429/120
(Continued)

FOREIGN PATENT DOCUMENTS

DE          4327391    *  2/1995 .......... H01M 10/625
DE         19523285       1/1996
(Continued)

OTHER PUBLICATIONS

Dennstedt, DE4327391TRANS (English Translation), Feb. 1995.*
(Continued)

*Primary Examiner* — Len Tran
*Assistant Examiner* — Eric Ruppert
(74) *Attorney, Agent, or Firm* — Norton Rose Fulbright US LLP; Gerard Messina

(57) ABSTRACT

A device and a method for controlling the temperature of a unit to be controlled in its temperature, including a unit to be heated or cooled, a temperature-control circuit having a recirculatable, heat-transferring medium, the flow direction of the medium through the temperature-control circuit being reversed following at least one predefined time interval or according to a control based on a temperature of the unit to be controlled in its temperature, characterized by the fact that the intake temperature of the recirculatable, heat-transferring medium is higher than the setpoint temperature of the unit to be controlled in its temperature, as long as the actual temperature of the unit requiring temperature control is lower than its setpoint temperature, and the intake temperature of the recirculatable, heat-transferring medium is lower than the setpoint temperature of the unit to be controlled in its temperature, if the actual temperature of the unit to be (Continued)

controlled in its temperature exceeds its setpoint temperature.

6 Claims, 1 Drawing Sheet

(51) Int. Cl.
G05D 23/19 (2006.01)
H01G 2/08 (2006.01)
H01G 9/00 (2006.01)
H01G 9/26 (2006.01)
H01G 11/08 (2013.01)
H01G 11/18 (2013.01)
H01M 8/04007 (2016.01)
H01M 8/04014 (2016.01)
H01M 8/04029 (2016.01)
B60H 1/00 (2006.01)
H01M 10/625 (2014.01)
H01M 10/615 (2014.01)
H01M 10/633 (2014.01)
H01M 10/6563 (2014.01)
H01M 10/6567 (2014.01)
H01M 10/617 (2014.01)
H01M 10/6565 (2014.01)
H01M 10/627 (2014.01)
H01M 10/613 (2014.01)
H01M 10/656 (2014.01)

(52) U.S. Cl.
CPC ............ *H01G 2/08* (2013.01); *H01G 9/0003* (2013.01); *H01G 9/26* (2013.01); *H01G 11/08* (2013.01); *H01G 11/18* (2013.01); *H01M 8/04007* (2013.01); *H01M 8/04014* (2013.01); *H01M 8/04029* (2013.01); *H01M 10/613* (2015.04); *H01M 10/615* (2015.04); *H01M 10/617* (2015.04); *H01M 10/625* (2015.04); *H01M 10/627* (2015.04); *H01M 10/63* (2015.04); *H01M 10/633* (2015.04); *H01M 10/656* (2015.04); *H01M 10/6563* (2015.04); *H01M 10/6565* (2015.04); *H01M 10/6567* (2015.04); *Y02E 60/13* (2013.01); *Y02T 10/7022* (2013.01)

(58) Field of Classification Search
CPC ............ H01M 10/617; H01M 10/6563; H01M 10/6567; H01M 10/6568; H01M 10/6565
USPC ............ 165/4, 11.1, 200, 297, 288, 104.33; 429/62, 120
See application file for complete search history.

(56) References Cited

U.S. PATENT DOCUMENTS

| | | | |
|---|---|---|---|
| 6,407,533 B1 * | 6/2002 | Bartek | H05K 7/20618 320/150 |
| 2003/0031905 A1 | 2/2003 | Saito et al. | |
| 2004/0137313 A1 * | 7/2004 | Jaura | H01M 10/63 429/62 |
| 2010/0089556 A1 * | 4/2010 | Yang | F28D 1/0477 165/145 |
| 2010/0122802 A1 * | 5/2010 | Yang | F28D 21/00 165/104.31 |
| 2012/0088130 A1 * | 4/2012 | Becker | H01M 10/6561 429/71 |

FOREIGN PATENT DOCUMENTS

| | | |
|---|---|---|
| DE | 102007034300 | 2/2008 |
| DE | 102007016865 | 10/2008 |
| DE | 102007017172 | 10/2008 |

OTHER PUBLICATIONS

Kammerer, DE102007017172TRANS (English Translation), Oct. 2008.*
International Search Report for PCT/EP2012/052839, dated Jul. 23, 2012.

* cited by examiner

METHOD AND DEVICE FOR HOMOGENIZING THE TEMPERATURE DISTRIBUTION OF BODIES WHICH HAVE FLUIDIC TEMPERATURE CONTROL

BACKGROUND INFORMATION

The properties of complex technical systems are nearly always affected by the temperature of its elements or components. For example, the temperature influences the performance, the service life or also the safety state of such systems. Complex technical systems therefore often require checks and active adjustments of their temperature. A temperature measurement and active temperature adjustment is of particular importance for systems whose function is based on electrochemical, chemical and/or physical processes. One example of a temperature-sensitive, complex technical system is a storage device for electrical energy, such as galvanic cells, e.g., lithium-ion cells, NiMH cells or lithium-polymer cells, and batteries. Batteries are galvanic cells connected in series and/or parallel, but accumulators may be considered batteries as well within the meaning of the present invention. Accumulators are multiple-use storage devices for electrical energy, often based on an electrochemical system, and therefore constitute a special type of battery. In contrast to non-rechargeable batteries made up of primary cells, an accumulator is made up of one or more rechargeable secondary secondary cell(s). As in the case of batteries, a plurality of cells may be connected in series in order to increase the overall voltage, or they may be connected in parallel to increase the capacitance. In addition to electrochemical cells, capacitors may also be used as storage cells for electrical energy, as well as hybrids made up of capacitors and electrochemical cells.

Storage cells for electrical energy, especially batteries, for example, are used to supply electrical energy to portable electrical devices, e.g., mobile telephones, laptops, camcorders, MP3 players, electric vehicles (EVs), PHEV (plug-in hybrid electrical vehicles), HEVs (hybrid electrical vehicles) or E-bikes, and stationary systems such as photovoltaic systems or network buffers.

The performance and service life of storage cells for electrical energy frequently depend heavily on their electrical, thermal and mechanical loading. For example, the individual cells of a battery degrade if the battery is operated within an unfavorable temperature range. In order to minimize a degradation of its individual cells in the course of the operational life of the battery, the actual temperature of the battery or its cells, that is, the temperature that the battery or its cells has or have at any given time, should not exceed a preferred operating temperature of the battery, i.e., the setpoint temperature. Preferred operating temperatures for NiMH batteries are between 10 to 55° C., for Li-ion batteries, between 10 to 40° C. Not only when operating a battery from which the stored energy is withdrawn, but also during charge processes of the multi-use batteries, the actual temperature may exceed the setpoint temperature if no separate cooling of the battery or its individual cells takes place.

Batteries are often cooled in order to ensure that the actual temperature of a battery does not rise beyond a setpoint temperature, so that at least their thermal loading is reduced during operation.

German Published Patent Application No. 10 2007 017 172 describes a cooling system for a unit to be cooled, which has a coolant circuit having a coolant able to be recirculated, which is set up in such a way that the recirculation direction of the coolant is reversible after at least one predefined time interval or according to a control that is based on a temperature of the cooling-requiring unit. The cooling-requiring unit may be a battery, power electronics, an electric motor or a fuel cell.

However, achieving the optimal output of a battery requires more than ensuring that the battery does not overheat and cooling it, so that its actual temperature does not exceed its setpoint temperature. To allow the most optimal exploitation of the battery capacity, especially at the beginning of its operation when the actual temperature of the battery is lower than its setpoint temperature, it may be useful to warm the battery in order to thereby reduce its internal resistance. In addition, safety-critical states may arise in lithium-ion cells if the cells are charged at temperatures that are too low in relation to the respective current. In addition to charging the lithium-ion cells at a charge station, this is important especially also for the recuperation, such as while driving.

Only when the battery has warmed up in the course of its operation and its actual temperature approaches the setpoint temperature will no further heating of the battery be required any longer.

SUMMARY

In a first aspect, the present invention relates to a method with whose aid a more homogeneous temperature distribution in bodies heated or cooled by fluids, or in units requiring heating or cooling is achieved.

In a further aspect, the present invention relates to a device with whose aid a more homogeneous temperature distribution of bodies heated or cooled by fluids or of units requiring heating or cooling is achieved.

Units requiring heating or cooling, for instance, are galvanic cells by which chemical energy is able to be converted into electrical energy, such as lithium-ion cells, NiMH cells and lithium polymer cells. Further examples of units requiring temperature control are batteries, capacitors, capacitor batteries, fuel cells and hybrid forms of the aforementioned units.

According to the first aspect, one subject matter of the present invention is a method for controlling the temperature of a unit requiring cooling or heating; the unit includes a unit requiring heating or cooling, a temperature-control circuit having a recirculatable, heat-transferring medium, in which the flow direction of the medium through the temperature-control circuit is reversed following at least one predefined time interval or according to a control based on a temperature of the unit requiring cooling or heating; it is characterized by the fact that the intake temperature of the recirculatable, heat-transferring medium is higher than the setpoint temperature of the unit requiring heating or cooling, as long as the actual temperature of the unit requiring heating or cooling is lower than its setpoint temperature, and the intake temperature of the recirculatable, heat-transferring medium is lower than the setpoint temperature of the unit requiring heating or cooling, if the actual temperature of the unit requiring heating or cooling exceeds its setpoint temperature.

DETAILED DESCRIPTION

A principle utilized by the present invention will be discussed in greater detail in the following text with the aid of the figures, without limiting the present invention to any extent in the process.

Figure 1A:
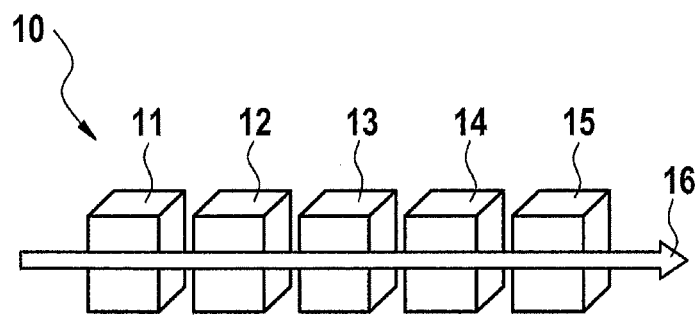
FIG. 1a shows a unit in need of cooling, which is made up of multiple components requiring cooling, through which a coolant is flowing in one direction.
Figure 1B:
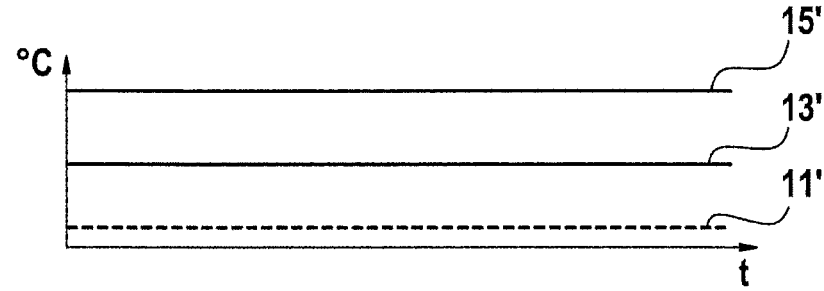
FIG. 1b is a graphical representation which illustrates the temperature of the cooling-requiring components of the unit to be cooled in their operating state.

In known methods as shown in FIG. 1a, a coolant 16 having a predefined intake temperature is flowing in unidirectional manner through a cooling-requiring unit 10 made up of multiple components 11, 12, 13, 14 and 15 to be cooled. The flow direction of coolant 16 through unit 10 to be cooled is indicated by the arrow. In this development, coolant 16 flows through components 11, 12, 13, 14 and 15 in sequence. Because of the cooling of the various components, the coolant gets warmer while flowing through unit 10 to be cooled. As a result, first component 11, for example, is more optimally cooled than last component 15 of the unit requiring cooling. First component 11 therefore has a lower temperature 11' than middle component 13, whose temperature 13' in turn is lower than temperature 15' of final component 15, which has the highest temperature of all components 11, 12, 13, 14 and 15 of unit 10 to be cooled. In the normal operating state, the individual components 11, 12, 13, 14 and 15 of unit 10 to be cooled have different temperatures during the entire operating period, and the temperature difference between two cooling-requiring components of unit 10 to be cooled remains essentially unchanged, as illustrated in FIG. 1b.

Figure 2A:
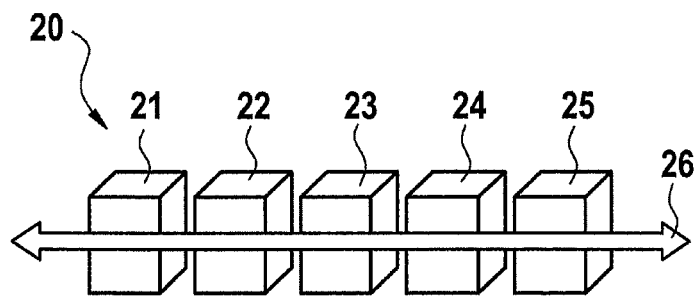
FIG. 2a shows a unit requiring heating or cooling, which includes multiple elements whose temperature is to be controlled, and for which the flow direction of a heat-transferring medium is reversible.
Figure 2B:
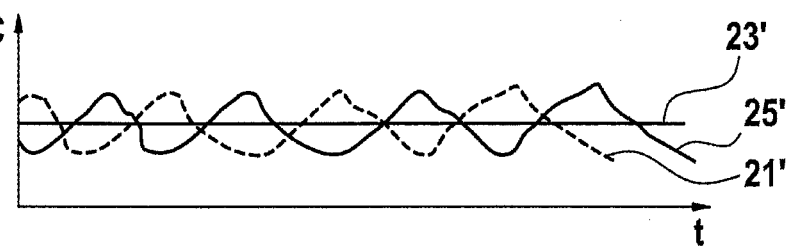
FIG. 2b is a graphical representation which illustrates the temperature of selected temperature-control-requiring elements of the unit to be heated or cooled, in a reversal of the flow direction of the heat-transferring medium after predefined time intervals.

FIG. 2a illustrates that the flow direction of heat-transferring medium 26 is reversed in the method of the present invention. In this method, a heat-transferring medium 26 is flowing through unit 20 requiring heating or cooling and possibly including multiple components 21, 22, 23, 24, 25 to be heated or cooled, the flow direction of heat-transferring medium 26 being reversed following predefined time intervals (indicated by the double arrow). FIG. 2b shows that the temperature difference between individual components 21, 22, 23, 24, 25 in temperature-control-requiring unit 20 does not remain constant during the operating period. However, the average temperature difference between individual components, especially between components that are disposed at a greater distance from one another, is not as large as it is in the unidirectional flow through unit 10. For example, temperature 21' of temperature-control-requiring component 21 and temperature 25' of temperature-control-requiring component 25 fluctuates about an average value that roughly temperature 23' of middle component 23 requiring temperature control [sic]. Even if the temperatures of the individual components 21, 22, 23, 24, 25 requiring temperature control are subject to certain fluctuations as a result of the repeated reversals of the flow direction of heat-transferring medium 26 through unit 20 requiring temperature control, the temperature distribution within unit 20 to be heated or cooled is more homogeneous than the temperature distribution in unit 10.

It is also the case that the temperature distribution in unit 20 requiring heating or cooling is more homogeneous than in element 10 to be cooled. In the method of the present invention, the thermal loading of the individual components 21, 22, 23, 24, 25 to be controlled in their temperature, and thus of unit 20 to be controlled in its temperature, is lower over all than in a unidirectional flow through a unit requiring heating or cooling. The more homogeneous temperature distribution in temperature-control-requiring unit 20 also is provided in a change of the intake temperature of heat-transferring medium 26, e.g., when the temperature control of unit 20 to be heated or cooled transitions from heating to cooling or, vice versa, from cooling to heating.

With the aid of the method of the present invention, the unit requiring temperature control may also first be heated to its setpoint temperature if it lies above its actual temperature. To the extent to which the temperature-control-requiring unit heats up while in operation and its actual temperature approaches the setpoint temperature, no additional heating of the temperature-control-requiring unit will be necessary any longer. Accordingly, the recirculatable, heat-transferring medium in the temperature-control circuit is no longer heated. If the actual temperature of the temperature-control-requiring unit exceeds its setpoint temperature or at least appears on the verge of exceeding it, the recirculatable, heat-transferring medium in the temperature-control circuit will be cooled.

The intake temperature of the recirculatable, heat-transferring medium preferably is lowered to the extent that its actual temperature of the temperature-control-requiring unit approaches the setpoint temperature. The intake temperature of the medium is lowered successively, i.e., in a continuous or stepwise manner.

Because of the reversal of the flow direction of the recirculatable, heat-transferring medium, the temperature in the unit to be heated or cooled is able to be controlled in more optimal manner; furthermore, the unit requiring heating or cooling reaches its setpoint temperature more rapidly, and the temperature distribution in the unit to be cooled or heated is able to be carried out more uniformly, so that the individual elements of the unit requiring heating or cooling have more homogeneous temperatures in relation to each other.

The intake temperature describes the temperature of the recirculatable, heat-transferring medium that is supplied to the unit requiring heating or cooling. Accordingly, the temperature of the medium discharged from the unit to be heated or cooled is denoted as return temperature.

The recirculatable, heat-transferring medium is a fluid. A fluid denotes a substance that poses no resistance to randomly slow shearing. The term 'fluid' encompasses both gases and gas mixtures, and also liquids and liquid mixtures.

In preferred specific embodiments, the fluid is selected from the group that includes air and water/glycol mixtures.

According to one specific embodiment of the method of the present invention, the temperature control circuit is equipped with a circulating pump. In this specific embodiment, the reversal of the flow direction of the recirculatable, heat-transferring medium takes place through a reversal of the pumping direction, and the recirculatable, heat-transferring medium is a liquid or a liquid mixture.

According to one alternative specific embodiment of the method of the present invention, the temperature control circuit has a blower, and the reversal of the flow direction takes place by reversing the blower direction, the recirculatable, heat-transmitting medium being a gas or a gas mixture.

According to one alternative or additional specific embodiment, the temperature control circuit includes a system of controllable and switchable selector valves, and the reversal of the flow direction of the recirculatable, heat-transferring medium is accomplished by actuating and switching the selector valves.

According to one further or additional specific embodiment, the reversal of the flow direction of the recirculatable, heat-transferring medium takes place as a function of at least one control parameter, which is selected from the group that includes the flow rate of the recirculatable, heat-transferring medium, the intake temperature of the recirculatable, heat-transmitting medium, the return temperature of the recirculatable, heat-transferring medium, and the reversal frequency of the flow.

In one first aspect, the present invention relates to a method for controlling the temperature of a unit to be cooled or heated, especially batteries (primary and secondary cells, including a unit requiring heating or cooling, a temperature control circuit which includes a recirculatable, heat-transferring medium, the method being characterized by the fact that the flow direction of the medium in the temperature control circuit is reversed after at least one predefined time interval or according to a control based on a temperature of the unit to be heated or cooled.

The flow direction of the medium is reversible. The reversal of the flow direction can be accomplished in various ways. According to one specific embodiment, the reversal of the flow direction is achieved by reversing the pumping direction of the medium. A circulating pump is required to transport the medium through the circuit. In the specific embodiment, the pumping direction of the circulating pump is reversible, so that the flow direction of the medium is reversible as well.

In another specific embodiment, the reversal of the flow direction is achieved with the aid of selector valves or components in the circuit that have shunting functions, so that the flow direction of the medium through the battery is reversible without the need to reverse the pumping direction or the blower direction.

The flow rate, the intake temperature of the medium, and/or the change frequency of the flow reversal are able to be used as control parameters within the framework of the present invention. Optimal control settings for each system are able to be determined with the aid of simulations and/or real tests. The period duration of a flow direction phase should be set such that it will not be greater than twice the throughput time of the medium.

The present invention also extends to a device for controlling the temperature of a unit requiring heating or cooling; the device has a temperature control circuit with a recirculatable, heat-transferring medium, which is set up in such a way that the recirculation direction of the temperature control means is reversible following at least one predefined time interval or according to a control which is based on a temperature of the unit to be heated or cooled, the temperature control means being characterized by being a heat source for controlling the temperature of the recirculatable, heat-transferring medium to a temperature that is higher than the setpoint temperature of the unit to be controlled in its temperature.

With the aid of the heat source, the recirculatable, heat-transferring medium is able to be heated to a temperature that is higher than the setpoint temperature of the unit to be controlled in its temperature. The actual temperature of the unit to be controlled in its temperature is able to be increased to its setpoint temperature with the aid of the heated medium.

Heat sources are technical devices or components of the device according to the present invention that emit heat to their environment, especially to the recirculatable, heat-transferring medium.

The device according to the present invention includes a cooling unit, i.e., a technical device or component of the device according to the present invention, which is able to cool the heat-transferring medium.

In one special development, the heat source and the cooling unit are one and the same unit of the device according to the present invention, e.g., a Peltier cooling/heating unit.

According to one special development, the recirculatable, heat-transferring medium is a fluid, preferably a fluid selected from the group that includes air and water/glycol mixtures.

According to another and/or an additional specific embodiment, the device includes a recirculation pump by which the flow direction of the recirculatable, heat-transferring medium is reversible by reversing the pumping direction.

According to an alternative specific embodiment, the device includes a blower by which the output direction of the blower is reversible by reversing the flow direction of the recirculatable, heat-transferring medium.

According to another and/or additional specific embodiment, the temperature control circuit of the device includes a system of controllable and switchable selector valves, and the reversal of the flow direction of the recirculatable, heat-transferring medium is able to be managed by actuating and switching the selector valves.

What is claimed is:

1. A method for controlling a temperature of a unit requiring heating or cooling, the unit having multiple cell components and including a temperature-control circuit which includes a recirculatable, heat-transferring medium, the method comprising:
    providing a first flow direction of the recirculatable, heat-transferring medium through the multiple components of the temperature-control circuit according to a control based on a temperature of the unit;
    reversing, following a time interval, the first flow direction of the recirculatable, heat-transferring medium through the multiple components of the temperature-control circuit according to the control based on the temperature of the unit;
    wherein if the setpoint temperature is above an actual temperature of the unit the unit is first heated to its setpoint temperature, so that to the extent to which the temperature-control-requiring unit heats up in operation and its actual temperature approaches the setpoint temperature, no additional heating of the unit is needed,
    wherein if the actual temperature of the unit exceeds or is about to exceed the setpoint temperature, the recirculatable, heat-transferring medium in the temperature-control circuit is cooled by lowering, in a continuous or stepwise manner, an intake temperature of the recirculatable, heat-transferring medium to the extent that the actual temperature of the unit approaches the setpoint temperature,
    wherein the reversal of the flow direction of the recirculatable, heat-transmitting medium takes place as a function of at least one control parameter corresponding to one of a flow rate of the recirculatable, heat-transferring medium, an intake temperature of the recirculatable, heat-transferring medium, and a return temperature of the recirculatable, heat-transferring medium, wherein the unit includes at least one of a battery, a NiMH cell, a lithium polymer cell, a capacitor, a capacitor battery, a fuel cell, and a hybrid form of the aforementioned units, wherein a temperature difference between individual components of the unit does not remain constant during an operating period, and wherein an average temperature in the unit is made more homogeneous or uniform so that the individual components of the unit have more homogeneous or uniform average temperatures in relation to each other;

wherein the intake temperature of the recirculatable, heat-transferring medium is higher than the setpoint temperature of the unit requiring heating or cooling, as long as the actual temperature of the unit requiring heating or cooling is lower than its setpoint temperature, and wherein the intake temperature of the recirculatable, heat-transferring medium is lower than the setpoint temperature of the unit requiring heating or cooling, if the actual temperature of the unit requiring heating or cooling exceeds its setpoint temperature.

2. The method as recited in claim 1, wherein the recirculatable, heat-transferring medium is a fluid.

3. The method as recited in claim 2, wherein the fluid includes one of air and a water/glycol mixture.

4. The method as recited in claim 2, wherein the temperature-control circuit includes a recirculation pump, and the reversal of the flow direction of the recirculatable, heat-transferring medium takes place via a reversal of a pumping direction, the recirculatable, heat-transferring medium being one of a fluid and a fluid mixture.

5. The method as recited in claim 1, wherein the temperature-control circuit includes a blower, and the reversal of the flow direction takes place via a reversal of a blower output direction, the recirculatable, heat-transferring medium being a gas or a gas mixture.

6. The method as recited claim 1, wherein the temperature control circuit includes a system of controllable and switchable selector valves, and the reversal of the flow direction of the recirculatable, heat-transferring medium is accomplished by actuating and switching the selector valves.

* * * * *